Patented July 20, 1937

2,087,547

UNITED STATES PATENT OFFICE 2,087,547

PROCESS AND COMPOSITION FOR TREATING MILLING PRODUCTS

Frederick H. Penn, Dallas, Tex.

No Drawing. Application January 13, 1936, Serial No. 58,984

23 Claims. (Cl. 99—232)

This application is a continuation-in-part of my earlier applications, Serial #678,313, filed June 29, 1933, and Serial #23,794, filed May 27 1935.

My invention relates to the treatment of milling products for the improvement of their color, baking and keeping qualities and more particularly has reference to a process and composition for the simultaneous bleaching and maturing and improving of wheat flour and other grain flours, vegetable flours and milling products in general, whereby a treating gas is generated in the milling product thereby overcoming the difficulties incident to the use of gaseous treating agents.

I have found that a dry free-flowing finely powdered chlorine-liberating compound, such as calcium hypochlorite of high available chlorine content, can be reacted with organic peroxides and other peroxidized products or compounds in dry free-flowing powdered condition to form a gaseous bleaching and maturing agent in the flour and it is accordingly an object of the present invention to improve milling products by this means.

The preferred chlorine-liberating compound of the present process and composition is the dry free-flowing, finely powdered, high chlorine containing calcium hypochlorite, containing approximately 60 to 70% available chlorine, and is the calcium hypochlorite referred to herein and in the claims appended hereto.

The substances capable of reacting with the calcium hypochlorite in the presence of the flour, to form a bleaching and maturing agent, are the dry free-flowing, finely powdered organic peroxides or peroxidized products heretofore employed in the treatment of milling products, benzoyl peroxide being particularly preferred as it is active, effective and easily handled in connection with the calcium hypochlorite. Other organic peroxides and peroxidized products of the type, such as acetyl, succinyl, cinnamyl, and similar peroxides which are less active than benzoyl peroxide, may be used when capable of preparation in a manner susceptible to fine grinding.

The less active organic peroxides do not release oxygen very readily although some of them contain more oxygen than active organic peroxides. The oxygen value of the less active organic peroxides may be improved by mixing them with small quantities of active organic peroxides or active organic peroxide compounds. This may be accomplished by intimately mixing an active organic peroxide or an active organic peroxide compound, i. e., fatty acid peroxides, fatty acid peroxide compounds or mixtures thereof, in suitable proportions, say 10 to 20%, with the less active organic peroxide. Suitable organic peroxide compounds and peroxides for improving the less active organic peroxides are benzoyl peroxide and the fatty acid peroxides, oleyl peroxide, capryl peroxide, lauryl peroxide, and the like, made from the higher or soap forming fatty acids, and active organic peroxide compounds made by the peroxidation of mixtures of organic acid chlorides and fatty acid chlorides, such as benzoyl chloride, fumaryl chloride, oleyl chloride and capryl chloride. The active and the less active organic peroxides and the organic peroxide compounds made from the peroxidation of the acid chlorides may be mixed, absorbed, or combined with a carrier such as rice-starch, di-calcium phosphate, or other suitable carriers.

The calcium hypochlorite and the dry free-flowing finely powdered peroxide or peroxidized compound may be added separately but simultaneously to the dry flour and intimately well mixed therewith, or the dry free-flowing finely powdered reagents may be pre-mixed in suitable proportions to react in the presence of the normal moisture content of the flour to form the bleaching, maturing and improving agent, and incorporated into the flour as a pre-formed composition.

By means of the powder feeding devices of the type in general use in the mills, small amounts of the composition, are fed into the flour at any convenient time or place in the milling operation.

As a specific and satisfactory example of the invention, there may be thoroughly distributed through a 198 pound barrel of flour one-half ounce, or more if required, of a dry free-flowing finely powdered composition consisting of 75 parts calcium hypochlorite and 25 parts benzoyl peroxide. Effective bleaching and aging are obtained in from 12 to 24 hours. These percentages may be varied and by test the proportions best suited may be determined for the particular grade and condition of milling product to be treated.

By the term "dry", as applied in the appended claims to the milling product, it is meant that the milling product, although containing its normal moisture content, has not been intentionally wetted by addition of water as is done, for example, in the making of dough.

Having described my invention, I claim:

1. A process for simultaneous improving flour and like milling products including the baking and keeping qualities thereof, which comprises thoroughly mixing with the dry milling product a dry free-flowing finely powdered calcium hypochlorite and a dry free-flowing finely powdered organic peroxide capable of and in such proportions as to react the calcium hypochlorite and the organic peroxide in the presence of the dry milling product to form a flour bleaching and maturing agent, and exposing the milling product in dry form to the action of said agent for time period adequate to effect substantial bleaching and maturing thereof.

2. A process for simultaneous improving flour and like milling products including the baking and keeping qualities thereof, which comprises thoroughly mixing with the dry milling product a dry free-flowing finely powdered calcium hypochlorite and a dry free-flowing finely powdered acyl peroxide capable of and in such proportions as to react the calcium hypochlorite and the acyl peroxide in the presence of the dry milling product to form a flour bleaching and maturing agent and exposing the milling product in dry form to the action of said agent for time period adequate to effect substantial bleaching and maturing thereof.

3. A process for simultaneous improving flour and like milling products including the baking and keeping qualities thereof, which comprises thoroughly mixing with the dry milling product a dry free-flowing finely powdered calcium hypochlorite and a dry free-flowing finely powdered aryl peroxide capable of and in such proportions as to react the calcium hypochlorite and the aryl peroxide in the presence of the dry milling product to form a flour bleaching and maturing agent and exposing the milling product in dry form to the action of said agent for time period adequate to effect substantial bleaching and maturing thereof.

4. A process for simultaneous improving flour and like milling products including the baking and keeping qualities thereof, which comprises thoroughly mixing with the dry milling product a dry free-flowing finely powdered calcium hypochlorite and a dry free-flowing finely powdered benzoyl peroxide capable of and in such proportions as to react the calcium hypochlorite and the benzoyl peroxide in the presence of the dry milling product to form a flour bleaching and maturing agent and exposing the milling product in dry form to the action of said agent for time period adequate to effect substantial bleaching and maturing thereof.

5. A process for simultaneous improving flour and like milling products which comprises thoroughly mixing therethrough a dry free-flowing finely powdered mixture of a major portion of a dry free-flowing finely powdered calcium hypochlorite and a minor portion of a dry free-flowing finely powdered benzoyl peroxide reacting the calcium hypochlorite and the benzoyl peroxide in the presence of the dry milling product to form a flour bleaching and maturing agent and exposing the milling product in dry form to the action of said agent for a time period adequate to effect substantial bleaching and maturing thereof.

6. A process for simultaneous improving flour and like milling products including the baking and keeping qualities thereof, which comprises thoroughly mixing with the dry milling product a dry free-flowing finely powdered calcium hypochlorite and a dry free-flowing finely powdered benzoyl peroxide compound capable of and in such proportions as to react the calcium hypochlorite and the benzoyl peroxide compound in the presence of the dry milling product to form a flour bleaching and maturing agent and exposing the milling product in dry form to the action of said agent for time period adequate to effect substantial bleaching and maturing thereof.

7. An intimate mixture comprising a dry milling product incorporated with a small per cent. of a composition containing dry free-flowing finely powdered calcium hypochlorite in major proportion and dry free-flowing finely powdered benzoyl peroxide in minor portion.

8. An intimate mixture comprising a dry milling product incorporated with a small per cent. of a composition containing dry free-flowing finely powdered calcium hypochlorite in major proportion and a dry free-flowing finely powdered benzoyl peroxide compound in minor portion.

9. A process for simultaneous improving flour and like milling products including the baking and keeping qualities thereof, which comprises thoroughly mixing with the dry milling product a dry free-flowing finely powdered calcium hypochlorite and a dry free-flowing finely powdered benzoyl peroxide and a less active organic peroxide capable of and in such proportions as to react the calcium hypochlorite and the benzoyl peroxide and less active organic peroxide in the presence of the dry milling product to form a flour bleaching and maturing agent and exposing the milling product in dry form to the action of said agent for time period adequate to effect substantial bleaching and maturing thereof.

10. A process for simultaneous improving flour and like milling products including the baking and keeping qualities thereof, which comprises thoroughly mixing with the dry milling product a dry free-flowing finely powdered calcium hypochlorite and a dry free-flowing finely powdered benzoyl peroxide compound and a less active organic peroxide capable of and in such proportions as to react the calcium hypochlorite and the benzoyl peroxide compound and less active organic peroxide in the presence of the dry milling product to form a flour bleaching and maturing agent and exposing the milling product in dry form to the action of said agent for time period adequate to effect substantial bleaching and maturing thereof.

11. A process for simultaneous improving flour and like milling products including the baking and keeping qualities thereof, which comprises thoroughly mixing with the dry milling product a dry free-flowing finely powdered calcium hypochlorite and a dry free-flowing finely powdered active organic peroxide and a less active organic peroxide capable of and in such proportions as to react the calcium hypochlorite and the active organic peroxide and less active organic peroxide in the presence of the dry milling product to form a flour bleaching and maturing agent and exposing the milling product in dry form to the action of said agent for time period adequate to effect substantial bleaching and maturing thereof.

12. A process for simultaneous improving flour and like milling products including the baking and keeping qualities thereof, which comprises thoroughly mixing with the dry milling product a dry free-flowing finely powdered calcium hypochlorite and a dry free-flowing finely powdered fatty acid peroxide capable of and in such proportions as to react the calcium hypochlorite and the fatty acid peroxide in the presence of the dry milling product to form a flour bleaching and maturing agent and exposing the milling product in dry form to the action of said agent for time period adequate to effect substantial bleaching and maturing thereof.

13. A process for simultaneous improving flour and like milling products including the baking and keeping qualities thereof, which comprises thoroughly mixing with the dry milling product a dry free-flowing finely powdered calcium hypochlorite and a dry free-flowing finely powdered fatty acid peroxide and a less active organic peroxide capable of and in such proportions as to react the calcium hypochlorite and the fatty acid peroxide and less active organic peroxide in the presence of the dry milling product to form a flour bleaching and maturing agent and exposing the milling product in dry form to the action of said agent for time period adequate to effect substantial bleaching and maturing thereof.

14. A process for simultaneous improving flour and like milling products including the baking and keeping qualities thereof, which comprises thoroughly mixing with the dry milling product a dry free-flowing finely powdered calcium hypochlorite and a dry free-flowing finely powdered fatty acid peroxide and a less active organic peroxide compound capable of and in such proportions as to react the calcium hypochlorite and the fatty acid peroxide and less active organic peroxide compound in the presence of the dry milling product to form a flour bleaching and maturing agent and exposing the milling product in dry form to the action of said agent for time period adequate to effect substantial bleaching and maturing thereof.

15. A process for simultaneous improving flour and like milling products including the baking and keeping qualities thereof, which comprises thoroughly mixing with the dry milling product a dry free-flowing finely powdered calcium hypochlorite and a dry free-flowing finely powdered fatty acid peroxide compound capable of and in such proportions as to react the calcium hypochlorite and the fatty acid peroxide compound in the presence of the dry milling product to form a flour bleaching and maturing agent and exposing the milling product in dry form to the action of said agent for time period adequate to effect substantial bleaching and maturing thereof.

16. A process for simultaneous improving flour and like milling products including the baking and keeping qualities thereof, which comprises thoroughly mixing with the dry milling product a dry free-flowing finely powdered calcium hypochlorite and a dry free-flowing finely powdered fatty acid peroxide compound and less active organic peroxide capable of and in such proportions as to react the calcium hypochlorite and the fatty acid peroxide compound and less active organic peroxide in the presence of the dry milling product to form a flour bleaching and maturing agent and exposing the milling product in dry form to the action of said agent for time period adequate to effect substantial bleaching and maturing thereof.

17. A process for simultaneous improving flour and like milling products including the baking and keeping qualities thereof, which comprises thoroughly mixing with the dry milling product a dry free-flowing finely powdered calcium hypochlorite and a dry free-flowing finely powdered fatty acid peroxide compound and a less active organic peroxide compound capable of and in such proportions as to react the calcium hypochlorite and the fatty acid peroxide compound and less active organic peroxide compound in the presence of the dry milling product to form a flour bleaching and maturing agent and exposing the milling product in dry form to the action of said agent for time period adequate to effect substantial bleaching and maturing thereof.

18. An intimate mixture comprising a dry milling product incorporated with a small per cent. of a composition consisting of a major portion of dry free-flowing finely powdered calcium hypochlorite and a minor portion of a dry free-flowing finely powdered organic peroxide.

19. An intimate mixture comprising a dry milling product incorporated with a small per cent. of a composition consisting of a major portion of dry free-flowing finely powdered calcium hypochlorite and a minor portion of a dry free-flowing finely powdered organic peroxide compound.

20. A flour improving composition comprising dry free-flowing finely powdered calcium hypochlorite and a dry free-flowing finely powdered organic peroxide in minor amount.

21. A flour improving composition comprising dry free-flowing finely powdered calcium hypochlorite and a dry free-flowing finely powdered organic peroxide compound in minor amount.

22. A flour improving composition comprising a dry, free-flowing, finely powdered calcium hypochlorite containing approximately 60 to 70% available chlorine and a dry, free-flowing, finely powdered organic peroxidic compound capable of and in such proportion as to react with said hypochlorite in the presence of flour to form a flour bleaching and maturing agent.

23. A method for improving flour and like milling products which comprises mixing with the dry milling product a dry, free-flowing, finely powdered calcium hypochlorite containing approximately 60 to 70% available chlorine and a dry, free-flowing, powdered organic peroxidic compound capable of and in such amount as to react with said hypochlorite in the presence of the dry milling product to form a flour bleaching and maturing agent, and exposing the milling product in dry form to the action of said agent for a time period adequate to effect substantial bleaching and maturing thereof.

FREDERICK H. PENN.